(12) United States Patent
Choe et al.

(10) Patent No.: US 10,947,697 B2
(45) Date of Patent: Mar. 16, 2021

(54) PIVOTING UNIT FOR CONSTRUCTION EQUIPMENT

(71) Applicant: VOLVO CONSTRUCTION EQUIPMENT AB, Eskilstuna (SE)

(72) Inventors: Won Kil Choe, Gyeongsangnam-do (KR); Dong Gyu Lee, Gyeongsangnam-do (KR)

(73) Assignee: Volvo Construction Equipment AB, Eskilstuna (SE)

( * ) Notice: Subject to any disclaimer, the term of this patent is extended or adjusted under 35 U.S.C. 154(b) by 261 days.

(21) Appl. No.: 15/763,165

(22) PCT Filed: Oct. 1, 2015

(86) PCT No.: PCT/KR2015/010372
§ 371 (c)(1),
(2) Date: Mar. 26, 2018

(87) PCT Pub. No.: WO2017/057787
PCT Pub. Date: Apr. 6, 2017

(65) Prior Publication Data
US 2018/0274205 A1    Sep. 27, 2018

(51) Int. Cl.
*F16D 55/40*    (2006.01)
*E02F 9/12*    (2006.01)
(Continued)

(52) U.S. Cl.
CPC ............... *E02F 9/128* (2013.01); *E02F 9/12* (2013.01); *E02F 9/20* (2013.01); *E02F 9/22* (2013.01);
(Continued)

(58) Field of Classification Search
CPC ...... F16D 65/186; F16D 65/853; F16D 55/36; F16D 55/40; F16D 2121/06; F16D 2127/04; F16D 2300/06; E02F 9/128; E02F 9/121
See application file for complete search history.

(56) References Cited

U.S. PATENT DOCUMENTS 3,819,018 A * 6/1974 Muller ................... E02F 9/121
                                                         192/223
4,245,724 A * 1/1981 Beck ....................... F16D 55/40
                                                         188/170

(Continued)

FOREIGN PATENT DOCUMENTS

EP    2626590 A1    8/2013
EP    2784227 A2    10/2014
(Continued)

OTHER PUBLICATIONS

International Search Report (dated Jun. 23, 2016) for corresponding International App. PCT/KR2015/010372.
(Continued)

*Primary Examiner* — Charles A Fox
*Assistant Examiner* — Ryan P Dodd
(74) *Attorney, Agent, or Firm* — Sage Patent Group

(57) ABSTRACT

A pivoting unit for construction equipment is provided which can ensure a brake performance for an upper pivoting body thereof for any pivoting power source applied thereto without a limitation to the applied pivoting power source. The pivoting unit for a construction equipment, comprises a pivoting motor, a pivoting reducer connected to the pivoting motor, and a parking brake device which is installed between the pivoting motor and the pivoting reducer and restricts the rotation of the pivoting reducer independently of the pivoting motor.

8 Claims, 3 Drawing Sheets

(51) Int. Cl.
*E02F 9/20* (2006.01)
*E02F 9/22* (2006.01)
*E02F 9/24* (2006.01)
*F16D 65/18* (2006.01)
*F16D 65/853* (2006.01)
*F16D 121/06* (2012.01)

(52) U.S. Cl.
CPC ............... *E02F 9/24* (2013.01); *F16D 55/40* (2013.01); *F16D 65/186* (2013.01); *F16D 65/853* (2013.01); *F16D 2121/06* (2013.01)

(56) References Cited

U.S. PATENT DOCUMENTS

| | | | | |
|---|---|---|---|---|
| 4,491,202 A * | 1/1985 | Schmitt | .................... | F16D 55/40 |
| | | | | 188/170 |
| 5,174,420 A * | 12/1992 | DeWald | .................. | B60T 1/065 |
| | | | | 188/170 |
| 6,817,963 B1 * | 11/2004 | Solka | .................. | B60K 17/046 |
| | | | | 180/372 |
| 2010/0198472 A1 * | 8/2010 | Kure | ......................... | B60T 5/00 |
| | | | | 701/70 |
| 2013/0161148 A1 * | 6/2013 | Schoon | ................... | B60T 1/062 |
| | | | | 192/219.4 |
| 2013/0248303 A1 * | 9/2013 | Okuno | .................... | F16D 55/36 |
| | | | | 188/67 |
| 2014/0190776 A1 * | 7/2014 | Kishinami | ............ | E02F 9/0833 |
| | | | | 188/170 |
| 2014/0296016 A1 * | 10/2014 | Okada | .................... | E02D 17/13 |
| | | | | 475/159 |

FOREIGN PATENT DOCUMENTS

| | | |
|---|---|---|
| JP | 2014109151 A | 6/2014 |
| JP | 2015152103 A | 8/2015 |
| KR | 20130009729 A | 1/2013 |
| KR | 20140098920 A | 8/2014 |
| KR | 20140118752 A | 10/2014 |

OTHER PUBLICATIONS

European Official Action (May 10, 2019) for corresponding European App. 15905497.2.

* cited by examiner

[Fig. 1]
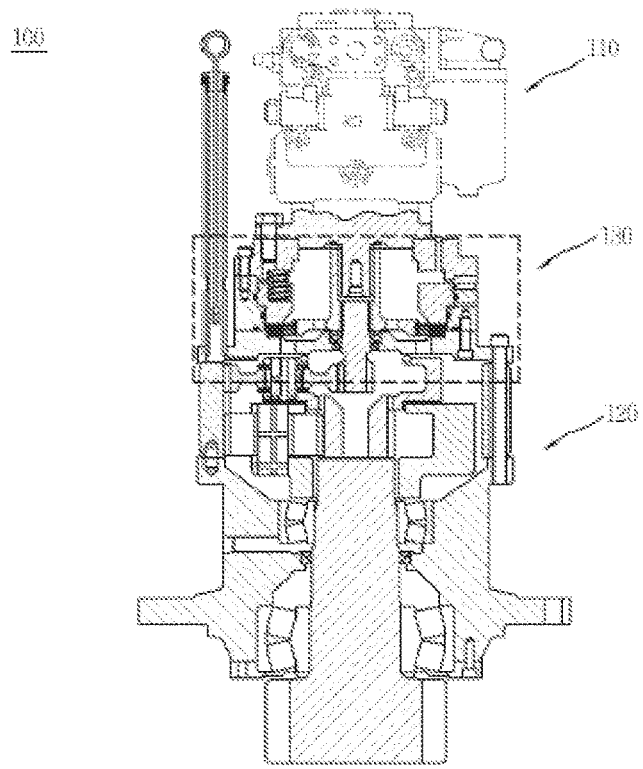
[Fig. 2]
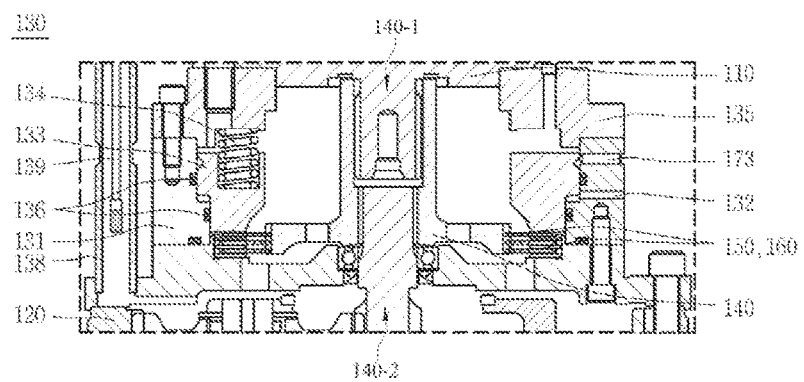
[Fig. 3]
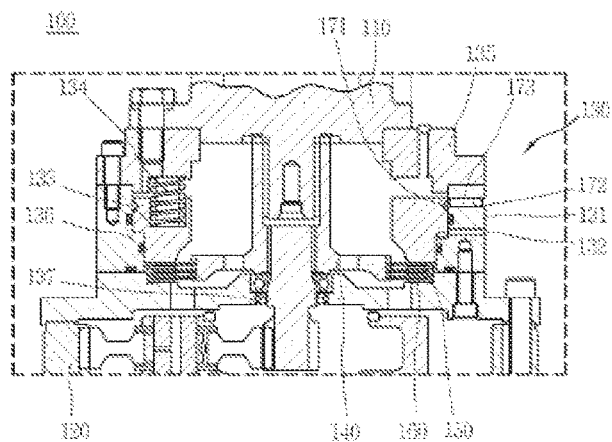

[Fig. 4]
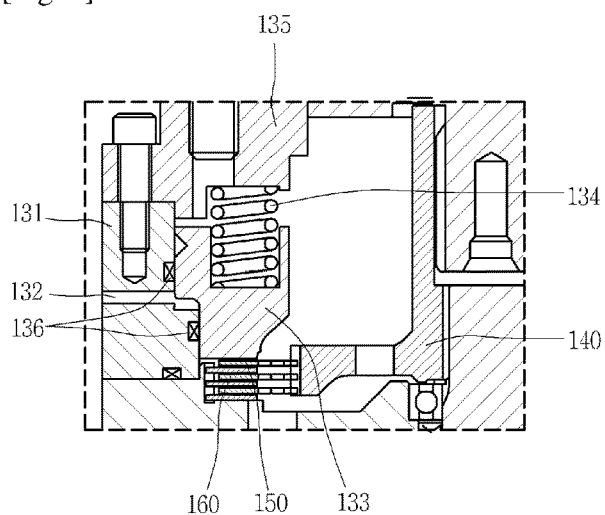
[Fig. 5]
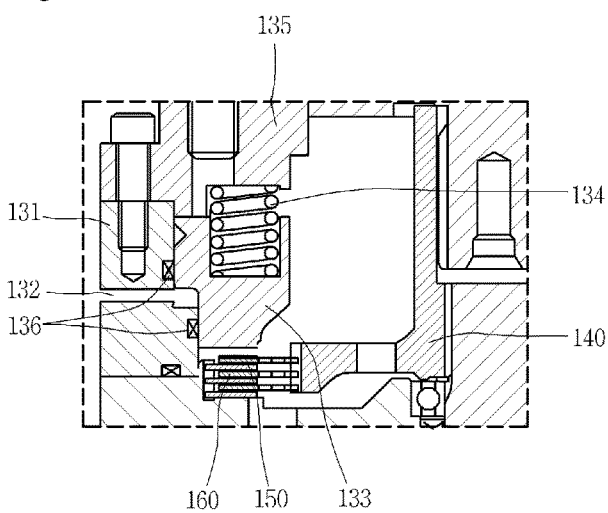
[Fig. 6]
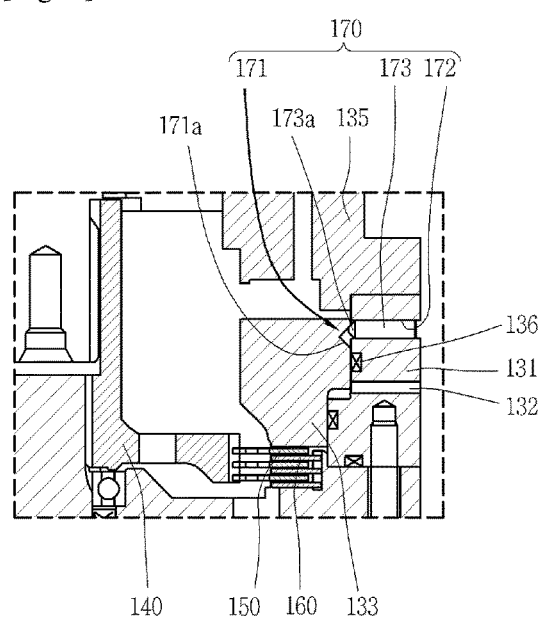

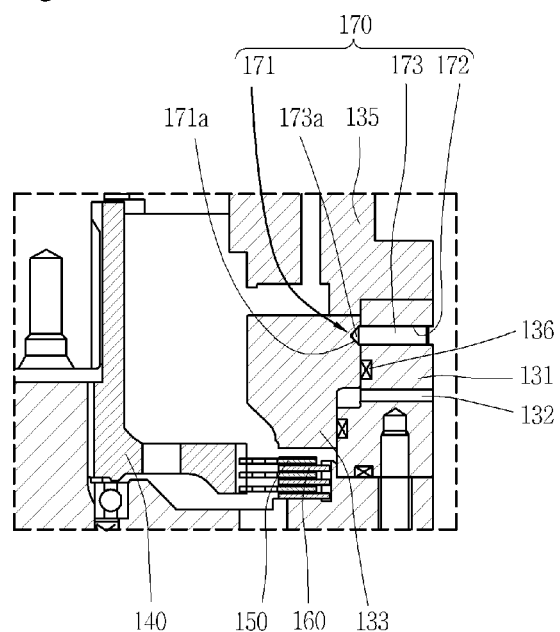
[Fig. 7]

PIVOTING UNIT FOR CONSTRUCTION EQUIPMENT

BACKGROUND AND SUMMARY

The present disclosure relates, in general, to a swing unit for construction equipment, and more particularly, to a swing unit for construction equipment, wherein the swing unit can ensure braking performance of an upper swing body even if any type of swing torque source is used, without limitations on swing torque sources used.

In general, an excavator, i.e. a representative example of a type of construction equipment, includes a lower traveling body and an upper swing body on which a working device is disposed. The upper swing body is driven by a swing unit.

A swing unit of the related art includes a hydraulic motor typically having a fixed capacity and a swing reducer implemented using a multi-stage planetary gear train. Such a swing unit acts to transfer a level of swing performance to the upper swing body depending on a pressure and flow rate of working fluid determined by a hydraulic system.

Recently, attempts to provide a high efficiency excavator through power loss minimization, energy regeneration, and the like, have been increasing. In this regard, a variety of attempts to substitute a fixed capacity hydraulic motor of a swing unit with a variable capacity pump, an electric motor, or the like, are underway.

However, unlike a hydraulic motor having a parking brake disposed therein, neither the variable capacity pump nor the electric motor is provided with a parking brake device that constrains an output shaft of the motor to prevent rotation while the motor is not operating. When a swing unit is implemented using the variable capacity pump and the electric motor, an upper swing body of an excavator located on a slope may be swung through inertia, or even after swing driving, the upper swing body may not be reliably fixed, which is problematic.

Accordingly, the present disclosure has been made keeping the above-described problems occurring in the related art in consideration, and the present disclosure proposes a swing unit for construction equipment, wherein the swing unit can ensure braking performance of an upper swing body even if any type of swing torque source is used, without limitations on swing torque sources used.

According to an aspect of the present disclosure, a swing unit for construction equipment may include: a swing motor; a swing reducer connected to the swing motor; and a parking brake device disposed between the swine motor and the swing reducer to constrain rotation of the swing reducer, separately from the swing motor.

The swing unit may further include a coupler connecting an output shaft of the swing motor and an input shaft of the swing reducer.

The swing unit may further include: a plurality of brake discs fitted to outer circumferential surfaces of the coupler to rotate at a same speed as a rotating speed of the coupler and be able to perform translation in an axial direction of the coupler; and a plurality of friction discs alternating with plurality of brake discs.

The parking brake device may include: a housing surrounding an outer circumference of the coupler while being spaced apart from the outer circumference of the coupler; at least one hydraulic port provided in a side portion of the housing to provide a path through which working fluid is introduced into the housing; a brake piston fitted to an inner portion of the housing, wherein the brake piston generates axial displacement in response to the working fluid and squeezes the plurality of brake discs and the plurality of friction discs or releases squeezing of the plurality of brake discs and the plurality of friction discs; and a return spring connected to one longitudinal end of the brake piston to elastically support the brake piston.

The parking brake device may further include a cover coupled to a top portion of the housing, the return spring being disposed between the cover and the brake piston.

The parking brake device may further include at least one first seal member provided between the housing and the brake piston.

The parking brake device may include a manual release portion.

The manual release portion may include: a recess provided in an outer circumferential surface of the brake piston facing a wall of the housing, and having an inclined surface; a hole provided in the wall of the housing that the recess faces; and a set screw having a head conforming to the recess, wherein the head is fitted into the recess by screw engagement of the set screw with the hole.

When the parking brake device is in a braking mode, a central axis of the recess and a central axis of the hole may be on different levels in a top-bottom direction.

When the set screw is screw-engaged with the hole to switch the parking brake device to a brake release mode, the recess may move upwardly while the head of the set screw is being fitted into the recess, so that the central axis of the recess, the central axis of the hole, and a central axis of the set screw are aligned on a same line.

The parking brake device may further include a second seal member provided on an outer circumferential surface of the coupler, located adjacently to the swing reducer, to seal an interior of the housing from the swing reducer.

Lubricant may be contained within the housing to a level sufficient for at least the brake discs and the friction disc to be submerged in the lubricant.

The parking brake device may further include: a lubricant injection tube provided outside of the housing to communicate with the interior of the housing; and a lubricant gauge disposed within the lubricant injection tube.

According to the present disclosure, since the parking brake device is disposed between the swing motor and the swing reducer, it is possible to ensure braking performance of an upper swing body without limitations on swing torque sources used, i.e. regardless of swing torque sources used, even if any type of swing torque source is used. For example, even if an electric motor without a brake function is disposed to drive the upper swing body, unnecessary movement of the upper swing body can be prevented while the motor is not operating.

In addition, according to the present disclosure, the use of the electric motor as a swing torque source of the swing unit can improve the swing efficiency of the excavator, and can improve the fuel efficiency of the excavator, for example, by storing regenerative power during swing deceleration.

Furthermore, according to the present disclosure, the provision of the manual release portion makes it possible to manually release the braking of the parking brake device, thereby improving the reliability and convenience of operation of the parking brake device.

BRIEF DESCRIPTION OF DRAWINGS

FIG. 1 is a cross-sectional view illustrating a swing unit for construction equipment according to exemplary embodiments;

FIG. 2 is an enlarged view of part "130" in FIG. 1;

FIG. 3 is a cross-sectional view illustrating the swing unit for construction equipment according to exemplary embodiments, to which a second seal member is added;

FIGS. 4 and 5 are cross-sectional views illustrating the operating and released states of the parking brake device of the swing unit for construction equipment according to exemplary embodiments; and FIGS. 6 and 7 are cross-sectional views illustrating the parking brake device of the swine unit for construction equipment according to exemplary embodiments before and after the parking brake device of the swing unit for construction equipment according to exemplary is manually released.

DETAILED DESCRIPTION

Hereinafter, a swing unit for construction equipment according to exemplary embodiments will be described in detail with reference to the accompanying drawings.

In the following disclosure, detailed descriptions of known functions and components incorporated herein will be omitted in the case in which the subject matter of the present disclosure may be rendered unclear by the inclusion thereof.

As illustrated in FIG. 1, a swing unit 100 for construction equipment according to exemplary embodiments is a device disposed on, for example, an excavator to be connected to an upper swing body of the excavator to drive the upper swing body depending on a pressure and flow rate of working fluid determined by a hydraulic system of the excavator. The swing unit 100 for construction equipment includes a swing motor 110, a swing reducer 120, and a parking brake device 130.

The swing motor 110 is a swing torque source of the swing unit 110 to generate swing torque. The swing motor 110 is connected to the swing reducer 120 to transfer swing torque to the swing reducer 120. The swing motor 110 and the swing reducer may be connected via a coupler (140 in FIG. 2). Specifically, an output shaft 140-1 of the swing motor 110 and an input shaft 140-2 of the swing reducer 120 are connected to one and the other longitudinal sides of the coupler (140 in FIG. 2), respectively. Accordingly, swing torque generated by the swing motor 110 is transferred to the swing reducer 120 via the coupler (140 in FIG. 2).

According to an exemplary embodiment, the swing motor 110 may be an electric motor to improve the swing efficiency of the excavator. However, this is illustrative only, and the swing motor 110 is not specifically limited to the electric motor. For example, the swing motor 110 may also be a hydraulic motor.

The swing reducer 120 is a device increasing swing torque transferred from the swing motor 110. In this regard, the swing reducer 120 according to an exemplary embodiment is connected to the swing motor 110 via the coupler (140 in FIG. 2). The swing reducer 120 may be a typical multi-stage planetary gear train, a description of a specific configuration of the swing reducer 120 omitted.

As illustrated in FIG. 2, the swing unit 100 for construction equipment according to exemplary embodiments further includes a plurality of brake discs 150 and a plurality of friction discs 160. The plurality of brake discs 150 are fitted to outer circumferential surfaces of the coupler 140 to rotate at the same speed as the rotation speed of the coupler 140. The plurality of brake discs 150 are configured to be able to perform translation in the axial direction of the coupler 140. In addition, the plurality of friction discs 160 are disposed to alternate with the plurality of brake discs 150. That is, the plurality of brake discs 150 and the plurality of friction discs 160 are sequentially and repeatedly disposed in a top-bottom direction (in the drawings), thereby providing a laminated structure. When the parking brake device 130 is switched to a braking mode, the brake discs 150 and the friction discs 160 having the laminated structure are squeezed against each other to constrain the rotation of the coupler 140 that is transferring swing torque, generated by the swing motor 110, to the swing reducer 120. The operations thereof will be described in greater detail later.

The parking brake device 130 is disposed between the swing motor 110 and the swing reducer 120. The parking brake device 130 constrains the rotation of the swing reducer 120 by itself, regardless of the swing motor 110, to prevent unnecessary swing motion of the upper swing body connected to the swing reducer 120. In this regard, the parking brake device 130 may include a housing 131, a hydraulic port 132, a brake piston 133, and a return spring 134. The housing 131 provides a contour of the parking brake device 130. The housing 131 is disposed on the top portion of the swing reducer 120. In addition, the housing 131 surrounds the outer circumference of the coupler 140 while being spaced apart from the outer circumference of the coupler 140, thereby providing a space, in which the brake piston 133 and the return spring 134 are disposed, between the housing 131 and the coupler 140.

The hydraulic port 132 is at least one hydraulic port provided in a side portion of the housing 131. The hydraulic port 132 is connected to a hydraulic line of the excavator to provide a path through which working fluid is introduced to the housing 131 to release the braking mode of the parking brake device 130.

The brake piston 133 is fitted to an inner portion of the housing 131. Specifically, the brake piston 133 is fitted to an inner portion of the housing 131 to be disposed on the top portion of the laminated structure comprised of the plurality of brake discs 150 and the plurality of friction discs 160. The brake piston 133 can be displaced in an axial direction (i.e. a top-bottom direction in the drawings) by working fluid introduced through the hydraulic port 132. Consequently, the brake piston 433 squeezes the brake discs 150 and the fiction discs 160 against each other or releases the brake discs 150 and the friction discs 160 from the squeezed position.

One end of the return spring 134 is connected to a longitudinal end of the brake piston 133, while the other end of the return spring 134 is connected to a cover 135 coupled to the top end of the housing 131. That is, the return spring 134 is disposed between the cover 135 at a fixed location and the brake piston 133 at a variable location to elastically support the brake piston 133. The return spring 134 is disposed between the cover 135 and the brake piston 133, compressed by a predetermined degree. Due to elastic force generated at a level corresponding to a displacement by which the return spring 134 is compressed, the brake piston 133 is pushed downwardly, thereby squeezing the brake discs 150 and the friction discs 160. When the brake discs 150 and the friction discs 160 are squeezed, as described above, friction generated by the contacting surfaces thereof constrains the rotation of the coupler 140 by which swing torque generated by the swing motor 110 is transferred to the swing reducer 120. This consequently stops the transfer of swing torque from the swing motor 110, acting as a swing torque source, to the swing reducer 120. That is, the parking brake device 130 is switched to the braking mode. In this regard, it is necessary for braking force generated by the elastic force of the return spring 134 to be designed to be maximum swing torque of the swing motor 110.

In addition, the parking brake device 130 may further include at least one first seal member 136 provided between the housing 131 and the brake piston 133. The first seal member 136, between the housing 131 and the brake piston 133, acts to prevent the leakage of working fluid entering the housing 131 through the hydraulic port 132.

In addition, according to an exemplary embodiment, lubricant must be contained within the housing 131 to a level sufficient for at least the laminated structure, comprised of the brake discs 150 and the friction disc 160, to be submerged in the lubricant, so that the parking brake device 130 operates properly. In this regard, as illustrated in FIG. 3, the parking brake device 130 may include a second seal member 137. The second seal member 137 is provided on an outer circumferential surface of the coupler 140, located adjacently to the swing reducer 120, to seal the interior of the housing 131 from the swing reducer 120. Accordingly, lubricant can be reliably contained within the housing 131. To determine and adjust the level of lubricant contained within the housing 131, the parking brake device 130 may further include a lubricant injection tube 138 and a lubricant gauge 139. The lubricant injection tube 138 may be provided outside of the housing 131 to communicate with the interior of the housing 131, so that lubricant can be injected into the housing 131 from the outside of the housing 131. In addition, the lubricant gauge 139 may be disposed within the lubricant injection tube 138 to determine the level of lubricant.

As described above, the swing unit 100 for construction equipment according to exemplary embodiments includes the parking brake device 130 to constrain the rotation of the swing reducer 120, separately from the swing motor 110 acting as a swing torque source. Accordingly, the swing unit 100 for construction equipment can ensure braking performance of an upper swing body even if any swing torque source is used, regardless of swing torque sources used. For example, even in the case in which the swing motor 110 for driving the upper swing body is an electric motor without a brake function, it is possible to reliably fix the upper swing body using the parking brake device 130 while the swing motor 110 is not operating. In particular, when an excavator is located on a slope, the upper swing body can be prevented from swinging due to inertia.

Hereinafter, the operation of the parking brake device of the swing unit for construction equipment according to exemplary embodiments will be described with reference to FIGS. 4 and 5.

FIG. 4 illustrates a braking mode of the parking brake device 130, while FIG. 5 illustrates a brake release mode of the parking brake device 130. First, the parking brake device 130 must be switched to a brake release mode simultaneously with or before the operation of the swing motor 110 so that the upper swing body of an excavator swings. In this regard, working fluid must be introduced into the housing 131 at a predetermined pressure through the hydraulic port 132. Working fluid, introduced to the housing 131 as described above, fills the internal space of the housing 131, thereby pressing a hydraulic portion of the brake piston 133, i.e. one end of the brake piston 133 in contact with the brake disc 150. In this case, when the force of working fluid applied to the one end of the brake piston 133 is greater than the elastic force of the return spring 134 for squeezing the brake discs 150 and the friction discs 160, the piston 133 is pushed upwards in the direction of the swing motor 110. When the brake piston 133 is moved upwardly, the return spring 134 is compressed, and at the same time, the squeezing between the brake discs 150 and the friction discs 160 is released. Since the friction between the brake discs 150 and the friction discs 160 is removed due to the release of the squeezing between the brake discs 150 and the friction discs 160, the coupler 140 is in a rotatable position. The rotatable position of the coupler 140 means that the parking brake device 130 is switched to the brake release mode. When the parking brake device 130 is switched to the brake release mode as described above, swing torque generated by the swing motor 110 is transferred to the swing reducer 120 via the coupler 140, so that the upper swing body can swing. While the upper swing body is swinging, a predetermined level of brake release pressure must be continuously applied to the hydraulic port 132. That is, working fluid must be continuously supplied into the housing 131 through the hydraulic port 132.

In contrast, when the swinging of the upper swing body is complete, the supply of working fluid through the hydraulic port 132 is stopped. When the supply of working fluid is stopped, force for pushing the brake piston 133 upwardly is not applied to the hydraulic portion of the brake piston 133, so that the return spring 134, compressed by working fluid, returns to the initial position due to the elastic force thereof. The brake piston 133 moves downwardly in a responsive manner. Due to the downward movement of the brake piston 133, the brake discs 150 and the friction discs 160 are squeezed, thereby constraining the rotation of the coupler 140. During this process, working fluid, contained within the housing 131, is discharged from the housing 131 through the hydraulic port 132. The constraining of the rotation of the coupler 140 means that the parking brake device 130 is switched to the braking mode. When the parking brake device 130 is switched to the braking mode as described above, unnecessary swinging of the upper swing body can be prevented.

The parking brake device 130 according to exemplary embodiments may have a manual release portion 170. As illustrated in FIGS. 6 and 7, the manual release portion 170 may include a recess 171, a hole 172, and a set screw 173.

The recess 171 is provided in an outer circumferential surface of the brake piston 133 facing a wall of the housing 131. A head 173a of the set screw 173 is fitted into the recess 171. The recess 171 has an inclined surface 171a for interaction with the head 173a of the set screw 173. The interaction thereof will be described in greater detail later.

The hole 172 is provided in a horizontal direction in the wall of the housing 131, which the recess 171 faces. The hole 172 is configured to allow the interior of the housing 131 to communicate with the outside of the housing 131.

The head 173a, provided on the leading end of the set screw 173, conforms to the recess 171 having the inclined surface 171a. The head 173a is fitted into the recess 171 by screw engagement of the set screw 173 with the hole 172.

As illustrated in FIG. 6, when the parking brake device 130 is in the brake mode, the recess 171 and the hole 172 are arranged such that the central axes thereof are on different levels in a top-bottom direction. Specifically, when the parking brake device 130 is in the brake mode, the central axis of the recess 171 is located lower than the central axis of the hole 172. Here, the central axis is defined as being a central axis in the horizontal direction.

In addition, the set screw 173 is engaged with the hole 172 to manually switch the parking brake device 130 from the braking mode to the brake release mode. When the set screw 173 is screw-engaged with the hole 172 as described above, while the head 173a of the set screw 173 is being fitted into the recess 172, the inclined surface 171a of the recess 171 is contacted by the head 173a that is moving horizontally, as illustrated in FIG. 7, so that the recess 171 moves upwardly. When the fitting of the head 173a of the set screw 173 into the recess 171 is completed, the central axes of the recess 171, the hole 172, and the set scree 173 are aligned on the same line. Thus, when the set screw 173 is screw-engaged with the hole 172 to manually switch the parking brake device 130 into the brake release mode, the brake piston 133 is moved upwardly by the coupling force of the set screw 173. The squeezing between the brake discs 150 and the friction discs 160 is released, so that the coupler 140 is rotatable. Consequently, swing torque, generated by the swing motor 110 in response to the operation of the swing motor 110, can be transferred to the swing reducer 120 that drives the upper swing body of the excavator to swing.

As set forth above, according to exemplary embodiments, the braking mode of the parking brake device 130 can be released not only by working fluid entering the housing 131 through the hydraulic port 132, but also by manually operating the manual release portion 170. It is therefore possible to improve the reliability and convenience of operations of the parking brake device 130.

The foregoing descriptions of specific exemplary embodiments of the present disclosure have been presented with respect to the drawings and are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limited to the foregoing embodiments, but be defined by the Claims appended hereto and their equivalents.

The invention claimed is:

1. A swing unit for construction equipment, comprising:
a swing motor;
a swing reducer connected to the swing motor;
a parking brake device disposed between the swing motor and the swing reducer to constrain rotation of the swing reducer independently of a swing torque generated by the swing motor;
a coupler connecting an output shaft of the swing motor and an input shaft of the swing reducer;
a plurality of brake discs fitted to outer circumferential surfaces of the coupler to rotate at a same speed as a rotating speed of the coupler and be able to perform translation in an axial direction of the coupler; and
a plurality of friction discs alternating with plurality of brake discs,
wherein the parking brake device comprises:
a housing surrounding an outer circumference of the coupler while being spaced apart from the outer circumference of the coupler;
at least one hydraulic port provided in a side portion of the housing to provide a path through which working fluid is introduced into the housing;
a brake piston fitted to an inner portion of the housing, wherein the brake piston generates axial displacement in response to the working fluid and squeezes the plurality of brake discs and the plurality of friction discs or release squeezing of the plurality of brake discs and the plurality of friction discs;
a return spring connected to one longitudinal end of the brake piston to elastically support the brake piston; and
a manual release portion, and
wherein the manual release portion comprises:
a recess provided in an outer circumferential surface of the brake piston facing a wall of the housing, and having an inclined surface;
a hole provided in the wall of the housing that the recess faces; and
a set screw having a head conforming to the recess, wherein the head is fitted into the recess by screw engagement of the set screw with the hole.

2. The swing unit of claim 1, wherein the parking brake device further comprises a cover coupled to a top portion of the housing, the return spring being disposed between the cover and the brake piston.

3. The swing unit of claim 1, wherein the parking brake device further comprises at least one first seal member provided between the housing and the brake piston.

4. The swing unit of claim 1, wherein, when the parking brake device is in a braking mode, a central axis of the recess and a central axis of the hole are on different levels in a top-bottom direction.

5. The swing unit of claim 4, wherein, when the set screw is screw-engaged with the hole to switch the parking brake device to a brake release mode, the recess moves upwardly while the head of the set screw is being fitted into the recess, so that the central axis of the recess, the central axis of the hole, and a central axis of the set screw are aligned on a same line.

6. The swing unit of claim 1, wherein the parking brake device further comprises a second seal number provided on an outer circumferential surface of the coupler, located adjacently to the swing reducer, to seal an interior of the housing from the swing reducer.

7. The swing unit of claim 6, wherein lubricant is contained within the housing to a level sufficient for at least the brake discs and the friction discs to be submerged in the lubricant.

8. The swing unit of claim 7, wherein the parking brake device further comprises:
a lubricant injection tube provided outside of the housing to communicate with the interior of the housing; and
a lubricant gauge disposed within the lubricant injection tube.

* * * * *